(12) United States Patent
Kimizuka

(10) Patent No.: US 6,337,751 B1
(45) Date of Patent: Jan. 8, 2002

(54) SHEET FEEDING APPARATUS AND IMAGE PROCESSING APPARATUS

(75) Inventor: Eiichiro Kimizuka, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/139,674

(22) Filed: Aug. 25, 1998

(30) Foreign Application Priority Data

Aug. 26, 1997 (JP) ............................................. 9-229158
Jun. 30, 1998 (JP) ........................................... 10-183882

(51) Int. Cl.$^7$ ............................................... H04N 1/04
(52) U.S. Cl. ........................ 358/498; 271/160; 399/213
(58) Field of Search ................................ 358/498, 486, 358/488, 496, 474, 500, 505; 271/160, 147, 22; 399/213

(56) References Cited

U.S. PATENT DOCUMENTS 5,537,227 A * 7/1996 Samii ........................ 358/498
5,676,367 A * 10/1997 Oshino et al. ............... 271/212
5,897,259 A * 4/1999 Ahn ............................ 400/629
5,961,113 A * 10/1999 Morris ........................ 271/22
6,029,970 A * 2/2000 Hwang ........................ 358/498

* cited by examiner

Primary Examiner—Jerome Grant, II
Assistant Examiner—Negussie Worku
(74) Attorney, Agent, or Firm—Fitzpatrick, Cella, Harper & Scinto

(57) ABSTRACT

A sheet feeding apparatus for feeding sheets separately from a sheet bundle has a sheet supporting mechanism for supporting sheets feeding rotary unit for feeding the sheets pushing device for pushing the sheets supported by the sheet supporting mechanism moves between a pushing position and a non-pushing position in association with rotation of the feeding rotary unit and a damper connecting to the pushing device for reducing impacts occurring as a result of movement of the pushing device in association with rotation of feeding rotary unit.

15 Claims, 17 Drawing Sheets

SHEET FEEDING APPARATUS AND IMAGE PROCESSING APPARATUS

BACKGROUND OF THE INVENTION

1. Field of the Invention

This invention relates to a sheet feeding apparatus for feeding sheets separately one by one and an image processing apparatus using this.

2. Description of Related Art

Conventional image forming apparatus, such as laser printers, and conventional image processing apparatus, such as document scanners, have a structure in which plural sheets are set in a paper tray and separately fed one by one. Such a typical feeding apparatus is shown in FIG. 17.

Sheets S are set in a tray member 50, and a pickup roller 52 and a cam 53 coaxial with the pickup roller 52, which constitute a feeding rotary body, start rotating in a direction of arrow M upon drive of a roller shaft 51. An intermediate plate 54 is normally urged toward a direction of arrow N by a feeding spring (compression spring) 55, and a projection 54a of the intermediate plate 54 is in contact with the cam 53. The intermediate plate 54 is rotatable around a shaft 54b as a center; when the pickup roller 52 rotates in the direction of arrow M, the projection 54a of the intermediate plate 54 is disengaged from the cam 53, thereby pushing the intermediate plate 54 upward in the direction of arrow N by a feeding spring 55. This operation makes the topmost sheet of the sheet bundle in contact with the surface of the pickup roller 52 to feed the sheet in a direction of arrow P.

When sheets S are doubly fed at a time of pickup, the sheets are separated by a separation pad 56. The separation pad 56 is normally urged in a direction of arrow Q by a separation spring (compression spring) 57, thereby contacting to the pickup roller 52 always with a constant pressure. The sheet S is subsequently fed to the image processing unit 60 by way of a guide passage 59 by a feeding roller pair 58, thereby subject to a prescribed image processing.

With such a feeding apparatus thus described, however, a rotation axis (shaft 54b) of the intermediate plate 54 is located away from the pickup roller 52 to some extent, so that a position of the rotation axis determines the size of the apparatus.

To make such an apparatus compact, in a devised sheet feeding apparatus, the intermediate plate 54 is made smaller in the lengthwise direction, and the sheet pushing portion is not a rotational means but an up and down parallel moving means. However, such an apparatus moving up and down parallel the sheet pushing portion may generate impact sounds during parallel moving.

This invention is for solving the above problems. It is an object of the invention to provide a sheet feeding apparatus capable of reducing impact sounds even where a sheet pushing means operates and feeding sheets surely.

SUMMARY OF THE INVENTION

A representative structure according to the invention to accomplish the above object includes, in a sheet feeding apparatus for feeding sheets sheet by sheet separately from a placed sheet bundle, a sheet mounting portion for mounting sheets, a feeding rotary body for applying feeding force to the sheets, pushing means for pushing the sheet onto the feeding rotary body by moving in association with rotation of the feeding rotary body, and damper means for reducing impacts in connecting to a moving portion of the pushing means.

With the structure thus described, the pushing means operates with buffered impacts by the damper means even where the sheet pushing member of the pushing means is moved up and down parallel to make the apparatus compact, thereby reducing impact sounds.

The damper means may be constituted of an air damper, which operates to reduce air resistance when the pushing mean moves in a direction that the sheet is pushed toward the feeding rotary body, and thereby, the apparatus can reduce impact sound without increasing drive loads.

The sheet mounting portion or the sheet pushing member of the pushing means may be constituted having a friction coefficient of 0.1 or less with respect to a mounted sheet. A smaller frictional resistance on the sheet mount surface of the sheet mounting portion or the sheet pushing means allows sheets to be fed stably without exerting unnecessary force during sheet feeding.

A restricting portion for restricting a rear end of the mounted sheets from moving backward in a sheet conveyance direction is provided at the sheet mounting portion, thereby surely conveying the sheets.

Furthermore, an image forming means is attached to each sheet feeding apparatus described above as to form an image forming apparatus.

DETAILED DESCRIPTION OF PREFERRED EMBODIMENTS

Figure 1:
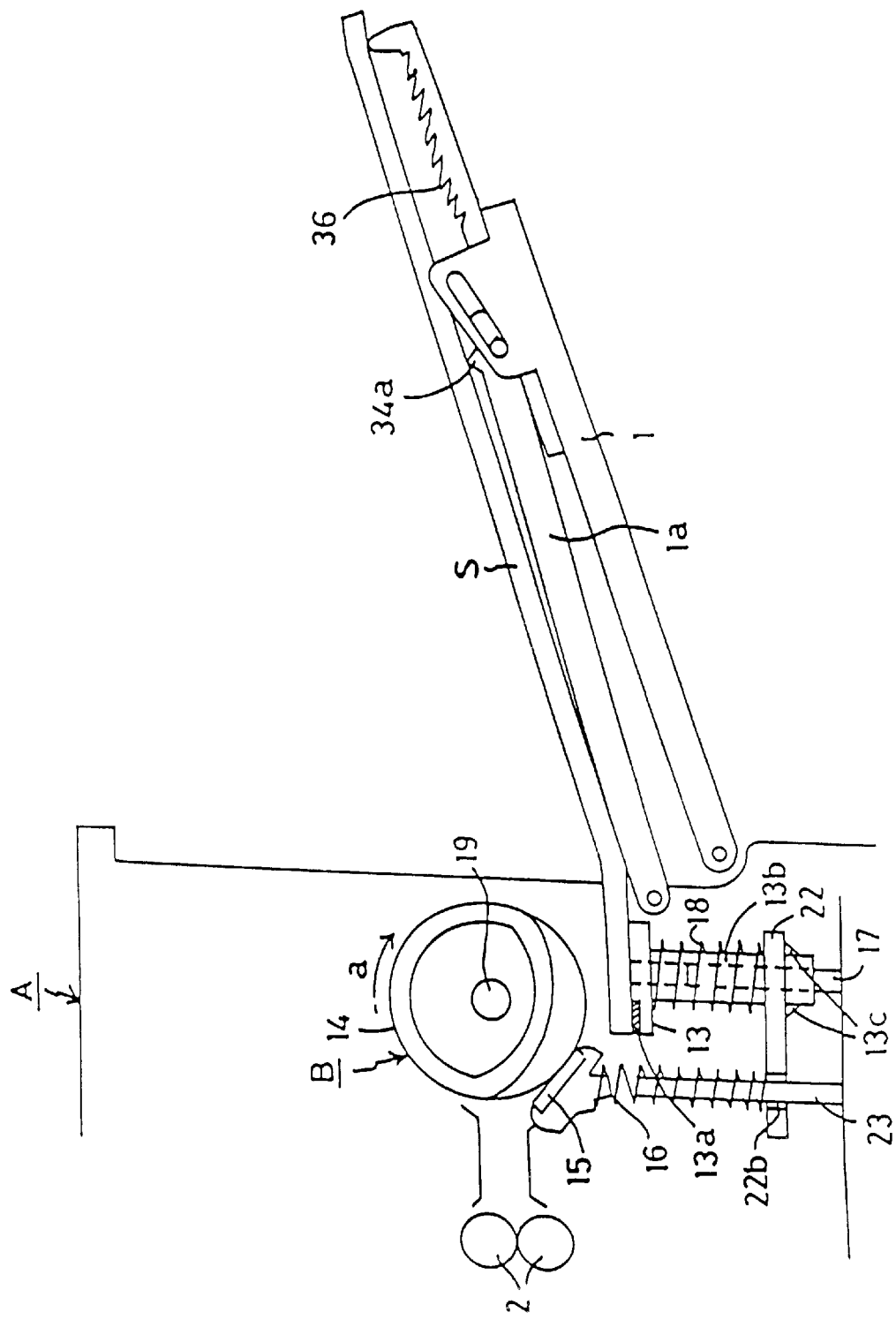
FIG. 1 is an illustration showing a sheet feeding apparatus.

Referring to the drawings, an embodiment of a sheet feeding apparatus according to the invention and an image forming apparatus using this is described.

[First Embodiment]

Figure 2:
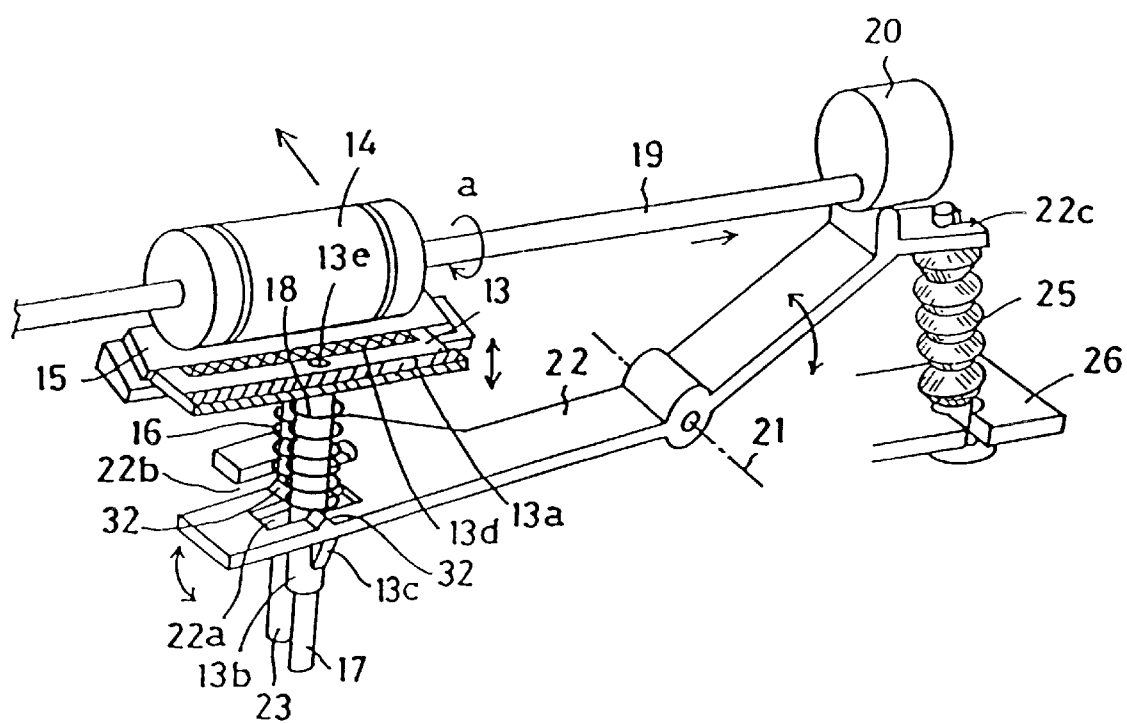
FIG. 2 is a perspective illustration showing an essential portion of the sheet feeding apparatus.
Figure 3:
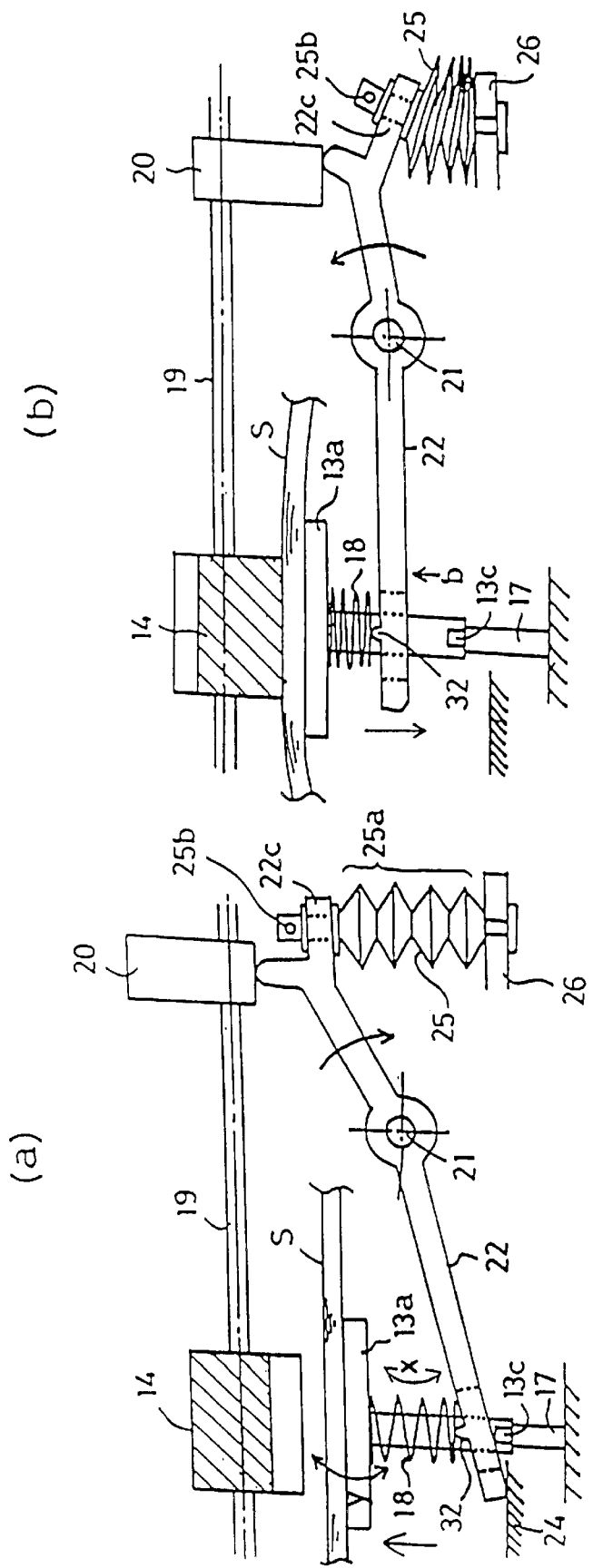
FIG. 3 is an illustration showing a state in which a pushing member corresponding to a feeding rotary body is moved.
Figure 4:
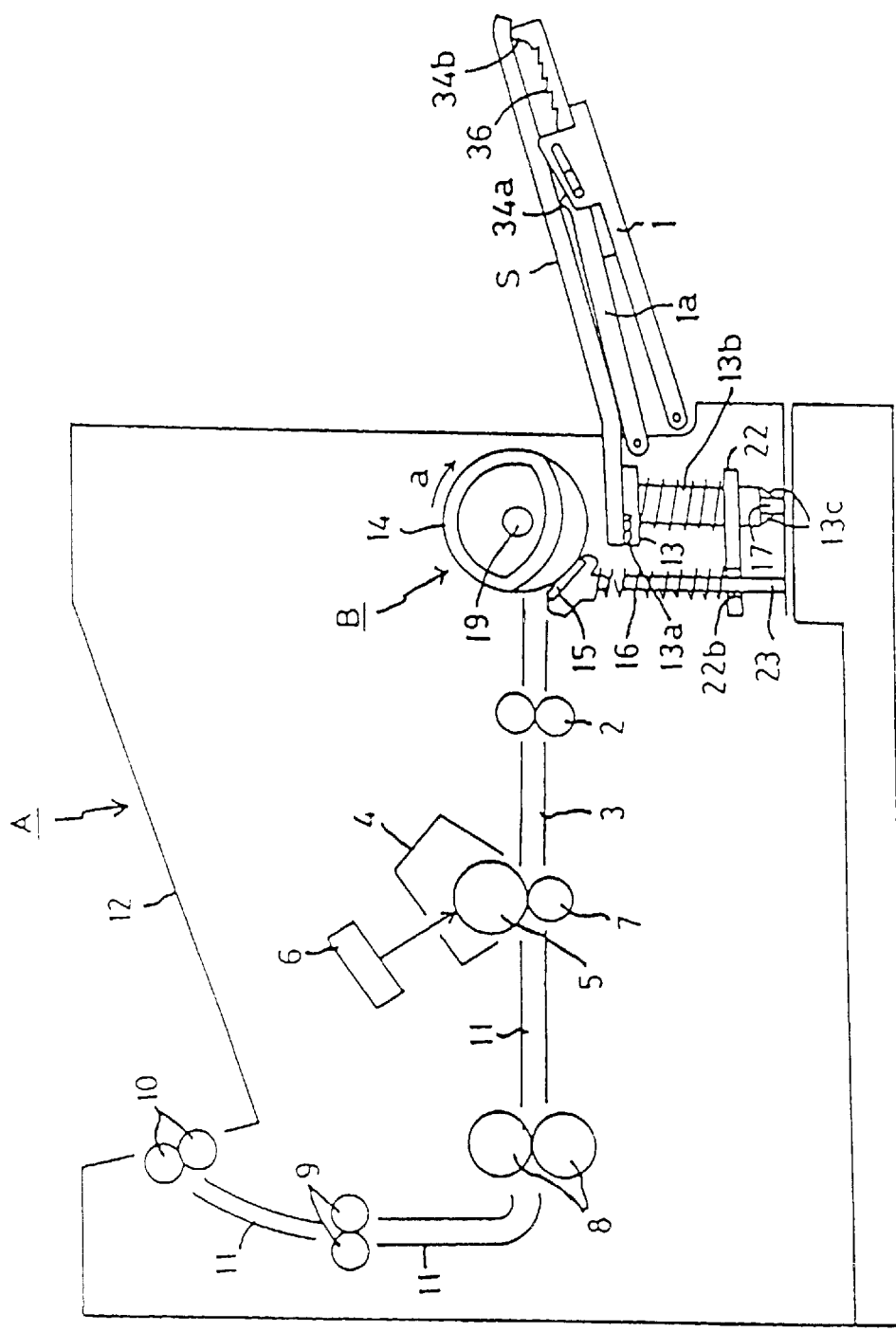
FIG. 4 is an entire illustration showing an image forming apparatus as an image forming means using the sheet feeding means.
Figure 5:
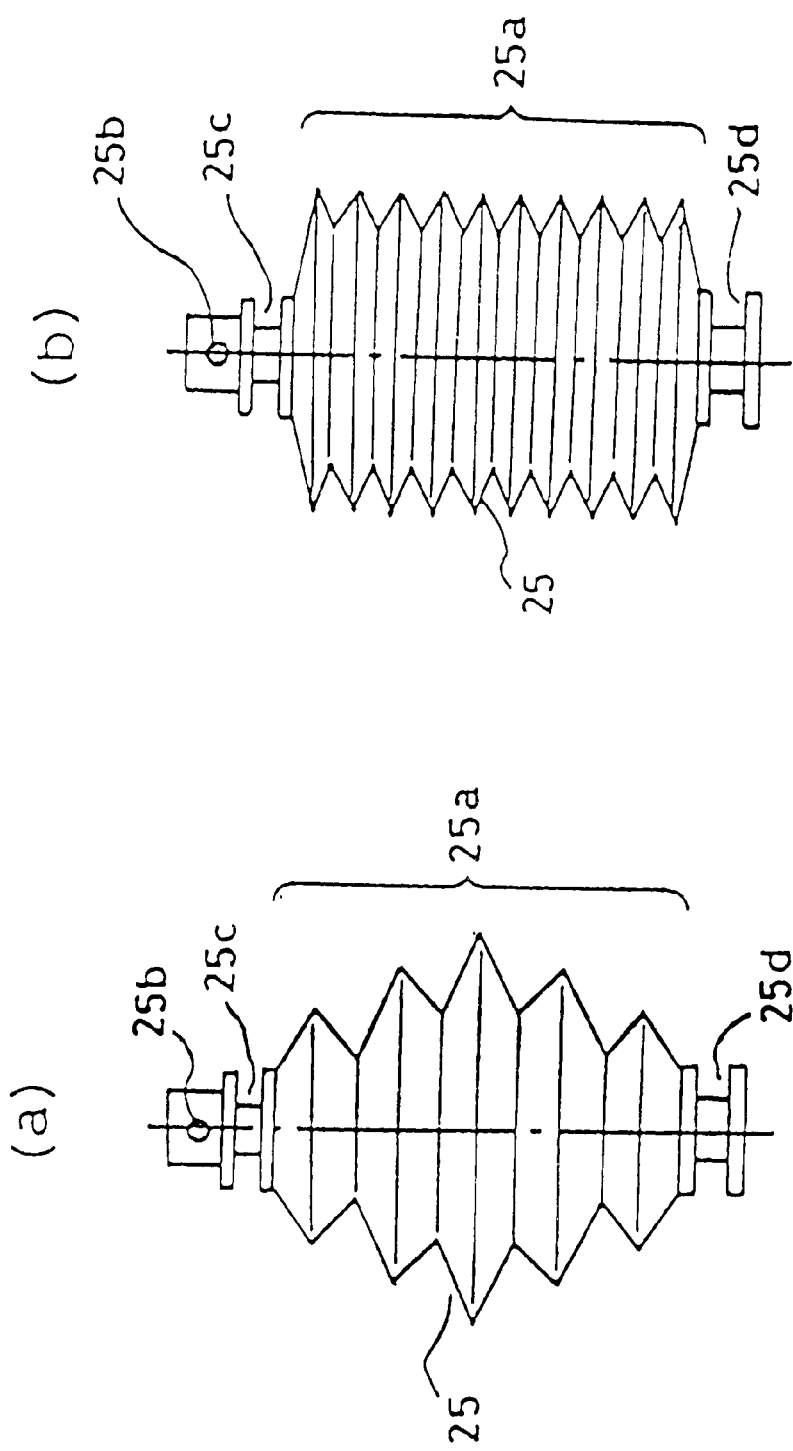
FIG. 5 is an illustration showing an embodiment of an air damper in which a bellows is transformed according to an attachment space.

Referring to FIGS. 1 to 5, a sheet feeding apparatus according to a first embodiment and an image forming apparatus using this are described. FIG. 1 is an illustration showing a sheet feeding apparatus; FIG. 2 is a perspective illustration showing an essential portion of the sheet feeding apparatus; FIG. 3 is an illustration showing a state in which a pushing member corresponding to a feeding rotary body is moved; FIG. 4 is an entire illustration showing an image forming apparatus as an image forming means using the sheet feeding means; and FIG. 5 is an illustration showing an embodiment of an air damper in which a bellows is transformed according to an attachment space.

Here, the entire structure of the image forming apparatus using the sheet feeding apparatus is first described, and the structure of the sheet feeding apparatus is described next.

[Image Forming Apparatus]

FIG. 4 shows a laser beam printer A using image forming means made of an electrophotographic system as an image processing means. Sheets S can be mounted by opening a front cover 1. A topmost sheet only is separately conveyed by a sheet feeding apparatus B described below upon pushing a start key where plural sheets S are set in the front cover 1 having a mounting tray 1a serving as a sheet mounting member. The sheet is conveyed to an image forming means 4 as an image processing means by way of a conveyance roller pair 2 and a guide path 3.

The image forming means 4 has charging means, developing means, cleaning means, not shown, disposed around a photosensitive drum 5; after the charging means charges uniformly the surface of the photosensitive drum 5, a laser scanner 6 forms a latent image by selective exposure; the latent image is then developed with toner at the developing means to visualize it. To form an image, the toner image is transferred onto the sheet S by applying a transfer bias voltage to a transfer roller 7. Remaining toner on the photosensitive drum 5 is removed by the cleaning means after the transfer.

When the sheet S on which a toner image is transferred passes through a pair of fixing roller 8 serving as a fixing means, the toner image is fixed onto the sheet S by application of heat and pressure, and the sheet S is delivered to a delivery tray 12 in a facedown state by way of deliver roller pair 9, 10 and a guide path 11.

[Sheet Feeding Apparatus]

Referring to FIGS. 1 to 3, the structure of the sheet feeding apparatus B feeding a sheet bundle set in the front cover 1 sheet by sheet separately is described.

As shown in FIG. 1, a feeding plate 13 serving as a pushing member is provided at a position at which the front end of the sheet S comes over when a sheet bundle is set in a front cover 1, and a pickup roller 14 serving as a rotary feeding body is disposed above the feeding plate 13. A separation pad 15 is pushed to the pickup roller 14 by a separation spring 16, thereby preventing the apparatus from feeding sheets S doubly.

FIG. 2 shows a structure of the feeding plate 13 and the pickup roller 14. The pickup roller 13 has a mounting surface 13a, a stem 13b, a stopper 13c, and a separation sheet material 13d for preventing the lowest sheet from being fed doubly. Numeral 13e is a through hole for the stem 13b. The mounting surface 13a is located below the pickup roller 14 and is formed so that the size in the length is designed narrower than the intermediate plate 54 of the prior art described above. A support shaft 17 fixed to the body of the image forming apparatus is inserted in the hole 13e of the feeding plate 13, and the shaft 17 guides the feeding plate 13 to move up and down reciprocally during image forming periods. A feeding spring 18 made of a compression spring is attached around an outer periphery of the stem 13b.

As shown in FIG. 2, a cam 20 is attached to an end of a roller shaft 19 of the pickup roller 14. When the pickup roller 14 revolves in a direction of arrow a in FIG. 2, one end (first end) of a lever member 22 pivotable around a pivotal shaft 21 attached to the image forming apparatus body is pushed down by the cam 20, thereby pushing up the other end (second end). A hole 22a having a size allowing the stem 13b of the feeding plate 13 to pass freely through it but not allowing the feeding spring 18 to pass through it is bore at the end of the lever member 22. A groove 22b not allowing the separation spring 16 to pass through it but allowing the shaft 23 supporting the separation spring 16 to pass through it is formed at the end the hole 22 is provided. The shaft 23 is secured to an image forming apparatus body and guides the separation spring 16 and the groove 22b.

With the sheet feeding apparatus thus structured, as shown in FIG. 3(a), a feeding spring 18 exists between an end of the lever member 22 and the mounting surface 13a of the feeding plate 13, and the separation spring 16 exists between an end of the lever member 22 and the separation pad 15. Therefore, as shown in FIG. 3(b), if an end of the lever member 22 directly pushes up the feeding and separation springs 18, 16 in a direction of arrow b, the top end of the feeding spring 18 pushes up the mounting surface 13a and the front end of the sheet S, and the top end of the separation spring 16 further comes to push the separation pad 15 to the pickup roller 14 with strong force as to prevent sheets from fed doubly. When the topmost sheet of the sheet bundle contacts the surface of the pickup roller 14, the feeding spring begins to be compressed. The topmost sheet S thereby receives conveyance force by rotating pickup roller 14. In a case when the sheets S are doubly fed when picked up, they are separated by the separation pad 15 as shown in FIGS. 1, 2.

When the pickup roller 14 further rotates, the cam 20 that rotates as a united body with the roller disengages pushing down of the first end of the lever member 22, thereby releasing compression energy of the feeding spring 18. The second end of the lever member 22 is quickly moved down upon reception of this spring force, thereby moving down the mounting surface 13a of the feeding plate 13 to release the nipped state between the mounted sheet bundle and the pickup roller 14, and the feeding process for a single sheet ends where the apparatus backs to a state shown in FIG. 3(a).

As described above, the feeding plate 13 is pulled down by the stopper 13c when the stopper 13c of the feeding plate 13 is pushed down by the end bottom of the lever member 22. As shown in FIG. 3(a), where the pickup roller 14 is at the home position, the feeding spring 18 is located intermediately in having a compressed pressure because the end of the lever member 22 on the feeding plate side is restricted by the stopper 13c, so that the space in the height direction is made smaller, and so that the apparatus can be made compact.

The lever member 22, a single member, simultaneously presses, the feeding spring 18 and the separation spring 16 in association with the cam 20, so that timings for making suitable feeding pressure at a pickup time and separation pressure of the sheet S can be met easily with each other. Similarly timings for releasing pressures of both springs 16, 18 can be met easily with each other.

When compression of the feeding spring 18 is released, the second end of the lever member 22 is quickly moved down, and as the number of the mounted sheets S is larger, the second end of the lever member 22 goes down faster because released energy from the feeding spring 18 becomes higher. That is, energy becomes higher in movement from a state shown in FIG. 3(b) to a state shown in FIG. 3(a). As a result, it is predicted that impact energy becomes higher at a time when the second end of the lever member 22 strikes the fixing portion 24 of the laser beam printer A.

According to this embodiment, to solve this problem, an air damper 25 serving as a damper means for buffering impacts from the lever member 22 as a movable portion of the pushing means is mounted between the key shaped attachment portion 22c formed on the first end of the lever member 22 and a fixing portion 26 of the apparatus housing.

The air damper 25 is made of essentially polyethylene and softening agents by a blow molding and has a bellows portion 25a and a hole portion 25b formed at the top of the damper. When the apparatus operates in shifting from the state shown in FIG. 3(a) to the state shown in FIG. 3(b), the lever member 22 expands the bellows portion 25a to flow air into the air damper 25. By this airflow into the damper, the damper is effectuated as to reduce the movement energy of the lever member 22, and thereby consequently reducing impact sounds.

As indicated in this embodiment, where the air damper 25 is located right below the cam 20, the apparatus can enjoy some merit such that the lever member 22 is free from unnecessary bending moment.

It is to be noted that the size of the hole 25, thickness, and number of corrugated units of the air damper 25 is desirably set as to properly work for damper effects. The outer shape of the corrugated portions, projecting portions and recessed portions, has a radius of curvature of 0.1 mm or more in consideration of durability. A material such as vinyl chloride or rubber is suitably used. The thickness of the air damper 25 is desirably set to about 0.3 mm for an apparatus of feeding pressure of 200 to 500 g and separation pressure of 200 to 500 g.

Thus, placement of such an air damper 25 for reducing impacts at the movable portion in the sheet feeding apparatus suppresses impact sounds and improves durability of the feeding apparatus that frequently operates in a repetitive way. During feeding of the sheets, images may be taken improperly while another sheet is subject to processing, but such image defects can be prevented by reducing impacts as described above.

When the apparatus does not have an adequate space for attaching the air damper 25 in the height direction, the outer diameter of the projecting and recessed portions of the bellows portion 25a may be varied as shown in FIG. 5(a). This can make the height lower because the projecting portions and the recessed portions are not overlapped with each other when compressed as if, for example, a collapsible lantern.

When there is an enough space in the height direction as a space for attaching the air damper 25, the number of corrugated units of the bellows 25a is increased. For example, if six or more of the projecting portions are formed, the bellows is stably compressed and is prevented from being eccentrically collapsed.

In FIG. 5, numeral 25c is a recess pushed in being deformed into the key shaped attachment portion 22c of the lever member 22, and numeral 25d is an attachment to be attached to the fixing portion 26 of the apparatus housing.

[Second Embodiment]

Figure 6:
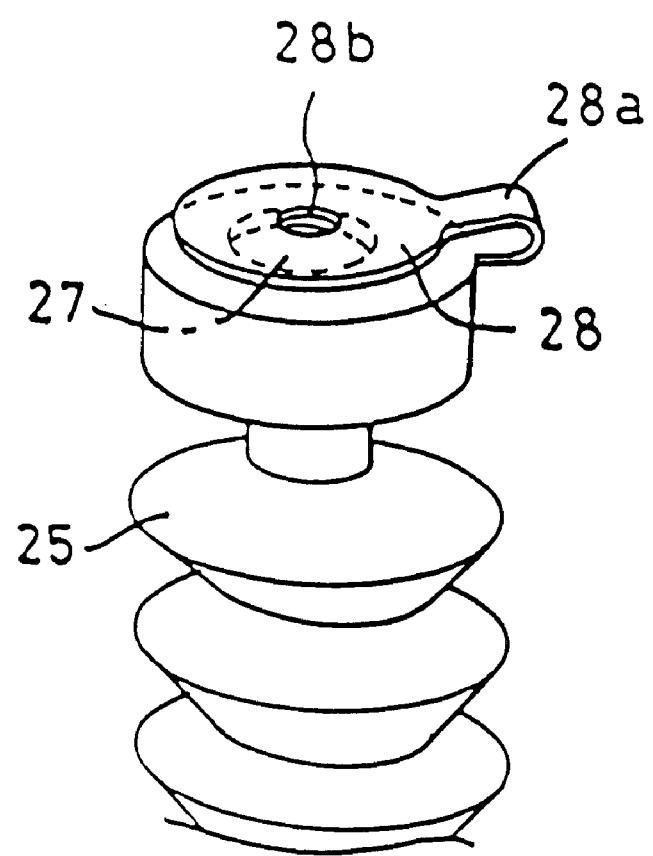
FIG. 6 is an illustration showing an air damper that can change incoming and outgoing airflow resistance by providing a valve.
Figure 7:
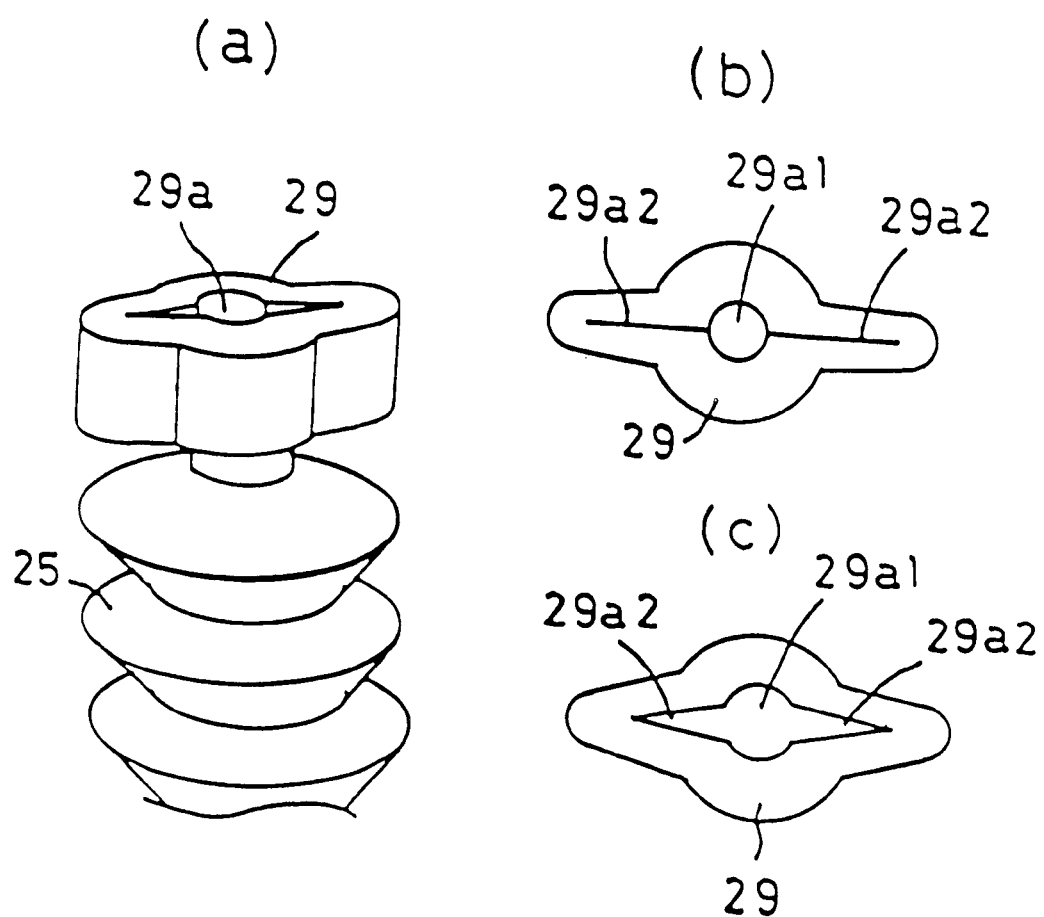
FIGS. 7(a), (b) and (c) are illustrations showing an air damper that can change incoming and outgoing airflow resistance by transforming the shape of airflow inlet and outlet.

Referring to FIGS. 6, 7, another example of the air damper as a second embodiment is described. FIG. 6 is an illustration showing an air damper that can change incoming and outgoing airflow resistance by providing a valve; FIG. 7 is an illustration showing an air damper that can change incoming and outgoing airflow resistance by transforming the shape of airflow inlet and outlet. The sheet feeding apparatus and the image processing apparatus using this air damper are essentially the same as the above embodiment, and the same reference numbers are used for members having the same functions as those of the embodiment described above.

In the embodiment described above, the air damper has a damper effect for reducing impact sounds. However, when the cam 20 pushes the first end of the lever member 22 to collapse the bellows 25a of the air damper 25 as shown in FIG. 3, resistance in which the hole 25b blows air out is produced, thereby raising a problem that the drive load becomes larger.

To solve this problem, as shown in FIG. 6, a hole (broken line) 27 is formed in the body of the air damper 25, and a valve 28 is attached to seal the hole 27. The valve 28 is attached to the damper body by way of a hinge 28a and has a hole 28b of a smaller diameter than that of the hole 27. The valve 28 can be open and closed between positions where the hole 27 is closed by overlapping the hole 28b and where the hole 27 is released.

Where the air damper 25 moves from the state shown in FIG. 3(a) to the state shown in FIG. 3(b) or a case that the air damper 25 is collapsed, the air is flown out of the larger diameter hole 27, thereby opening the valve 28 in a direction of an arrow around the hinge as a center. At that time, flowing resistance of the air is small because the hole 27 has the larger diameter. Therefore, the drive load of the lever member 22, even if so small, is satisfactory.

Conversely, where the air damper 25 moves from the state shown in FIG. 3(b) to the state shown in FIG. 3(a) or a case that the air damper 25 is extended, the damper inside holds a negative pressure, and the valve 28 is sucked again to the air damper body. Since air is flown from the hole 28b of the smaller diameter, the apparatus comes to have an adequate damper effect as to reduce the quick movement of the lever member 22. Such a one way function given to the air damper 25 allows impact sounds to be reduced without raising drive load of the lever member 22.

The valve 28 is openable and desirably made in contact with the air damper body when closed at portions except an area of the hole 28b. Therefore, as a material for forming the valve 28, such as rubber, polypropylene, vinyl chloride, and polyethylene are desirably used.

The air damper having the one way function can be made in a way shown in FIG. 7. As shown in FIG. 7, an airflow inlet and outlet portion 29 is formed, and a hole 29a is opened in the airflow inlet and outlet portion 29. FIG. 7(b) shows a top view of the airflow inlet and outlet portion 29. The hole 29a is constituted of a round hole 29a1 and a slit portion 29a2.

In this air damper, when the air damper 25 is collapsed in shifting from the state shown in FIG. 3(a) to the state shown in FIG. 3(b), the air flows out of the hole 29a. Because the pressure inside the air damper is high at that time, the slit portion 29a2 is widened as shown in FIG. 7(b), thereby enlarging the outlet of the air. In other words, the air resistance of the outgoing flow is made smaller. Therefore, the drive load of the lever member 22 can be made smaller.

Conversely, when the air damper 25 is expanded in shifting from the state shown in FIG. 3(b) to the state shown in FIG. 3(a), the inside of the damper holds a negative pressure. In the hole 29a, therefore, the slit portion 29a2 is closed. Air therefore flows through only the round hole 29a1 having the smaller diameter, so that the damper works with an adequate damper effect to buffer the quick movement of the lever member 22. In this case, similarly to the above, the air damper has the one way function, so that impact sounds can be reduced without increasing drive load of the lever member 22.

The air damper thus described is applicable to a conventional sheet feeding apparatus. Such an embodiment is described in referring to FIG. 8, a cross-sectional illustration, and to FIG. 9, a perspective illustration.

As shown in the drawings, where the sheets S are set in the mounting member 50 and the roller shaft 51 is driven, a pickup roller 52 serving as a feeding rotary body and a cam 53 arranged coaxially begin to rotate in a direction of arrow m. An intermediate plate 54 is normally urged in a direction of arrow n by a feeding spring (compression spring) 55, and a projection portion 54a of the intermediate plate 54 contacts with a cam 53. The intermediate plate 54 is pivotal around a shaft 54b as a center, and when the pickup roller 52 rotates in the direction of arrow m, the projection portion 54a of the intermediate plate 54 is disengaged from the cam 53, so that the intermediate plate 54 is pushed up in the direction of arrow n by the feeding spring 55. The topmost sheet of the sheet bundle is fed in a direction of arrow p because of contacting with the surface of the pickup roller 52.

During this operation, however, particularly, when the sheet bundle is mounted in a small amount, a stroke of the intermediate plate 54 which is pushed up by the feeding spring 55 becomes larger, and therefore, the topmost sheet receives a larger impact when contacting to the surface of the pickup roller 52.

Figure 8:
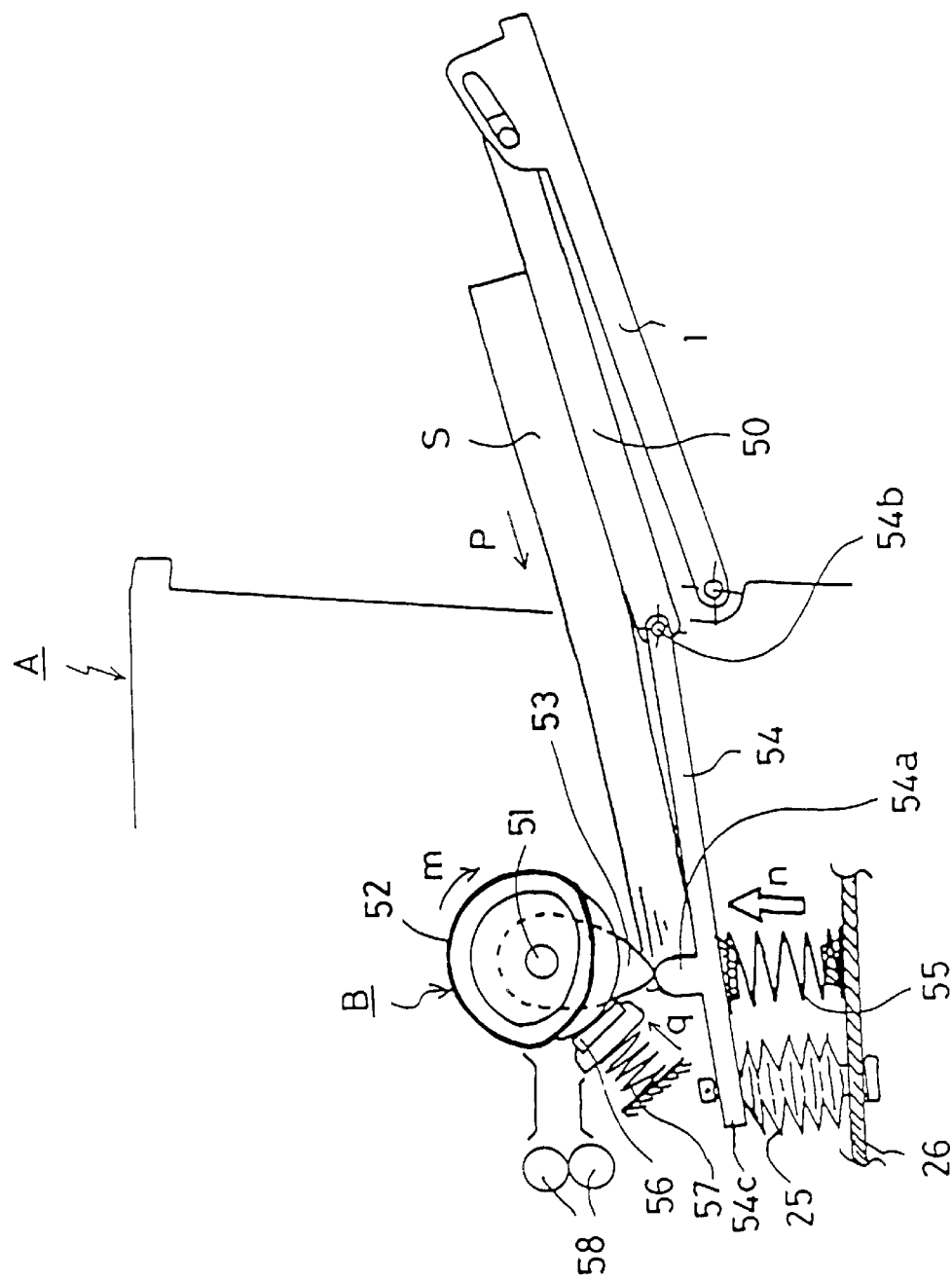
FIG. 8 is an illustration showing an embodiment in which an air damper mechanism is incorporated in a conventional sheet feeding structure.
Figure 9:
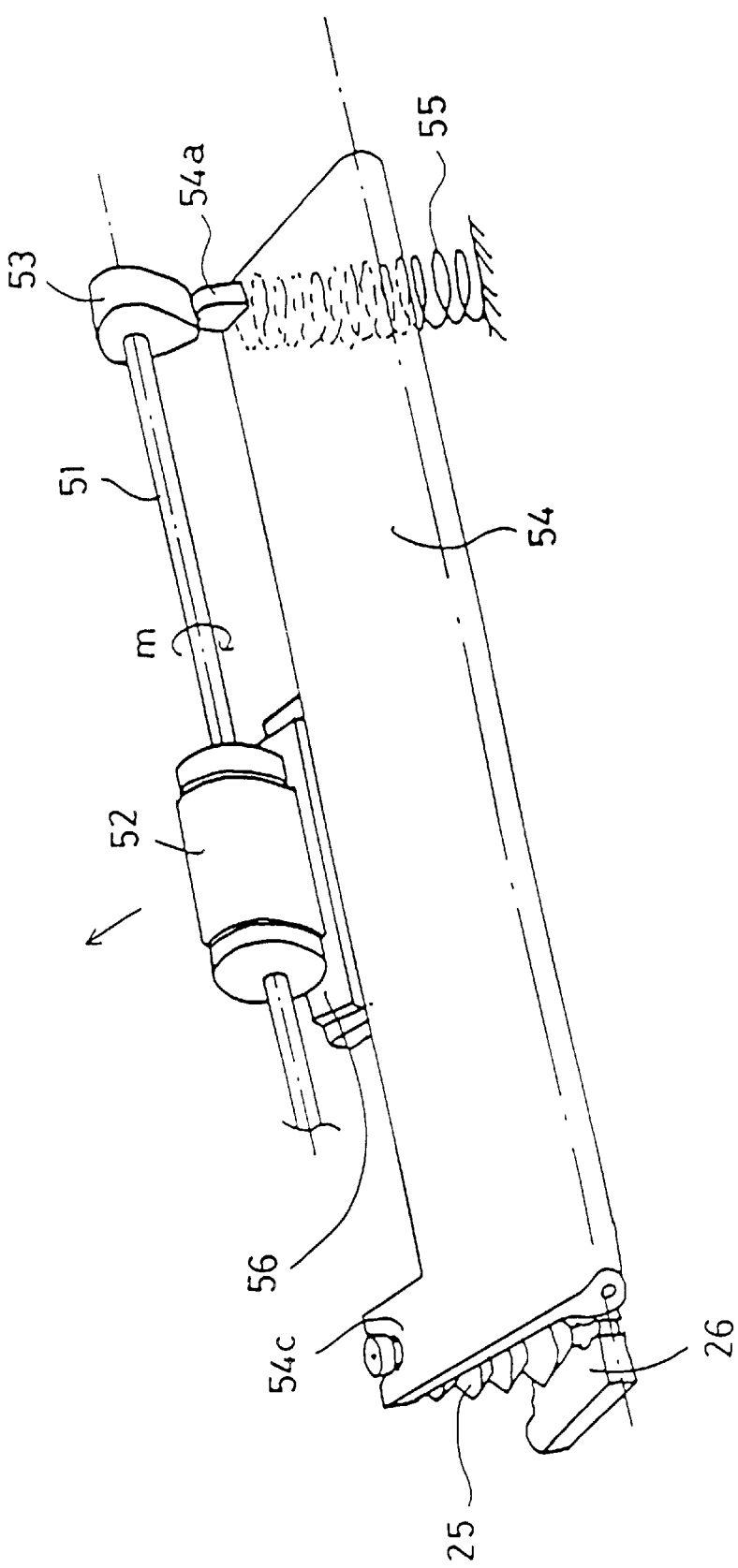
FIG. 9 is a perspective illustration showing an embodiment in which an air damper mechanism is incorporated in a conventional sheet feeding structure.

To solve this problem, as shown in FIGS. 8, 9, one end of the air damper 25 shown in the above embodiment is attached to the fixing portion 26, and the other end is attached to an attachment portion 54c of the intermediate plate 54.

This structure allows the bellows of the air damper 25 to be expanded to intake the air into the air damper 25 when the intermediate plate 54 is rotated and pushed up. The damper becomes effective as to reduce the movement energy of the intermediate plate 54 and consequently reduce impact sounds.

When the air damper with the valve 28 shown in FIG. 6, instead of the air damper shown in FIG. 5, is used, the damper has less effects when the intermediate plate 54 is pushed down, but when the intermediate plate is pushed up, the damper becomes effective, and can obtain substantially the same result as that in the above embodiment.

Figure 10:
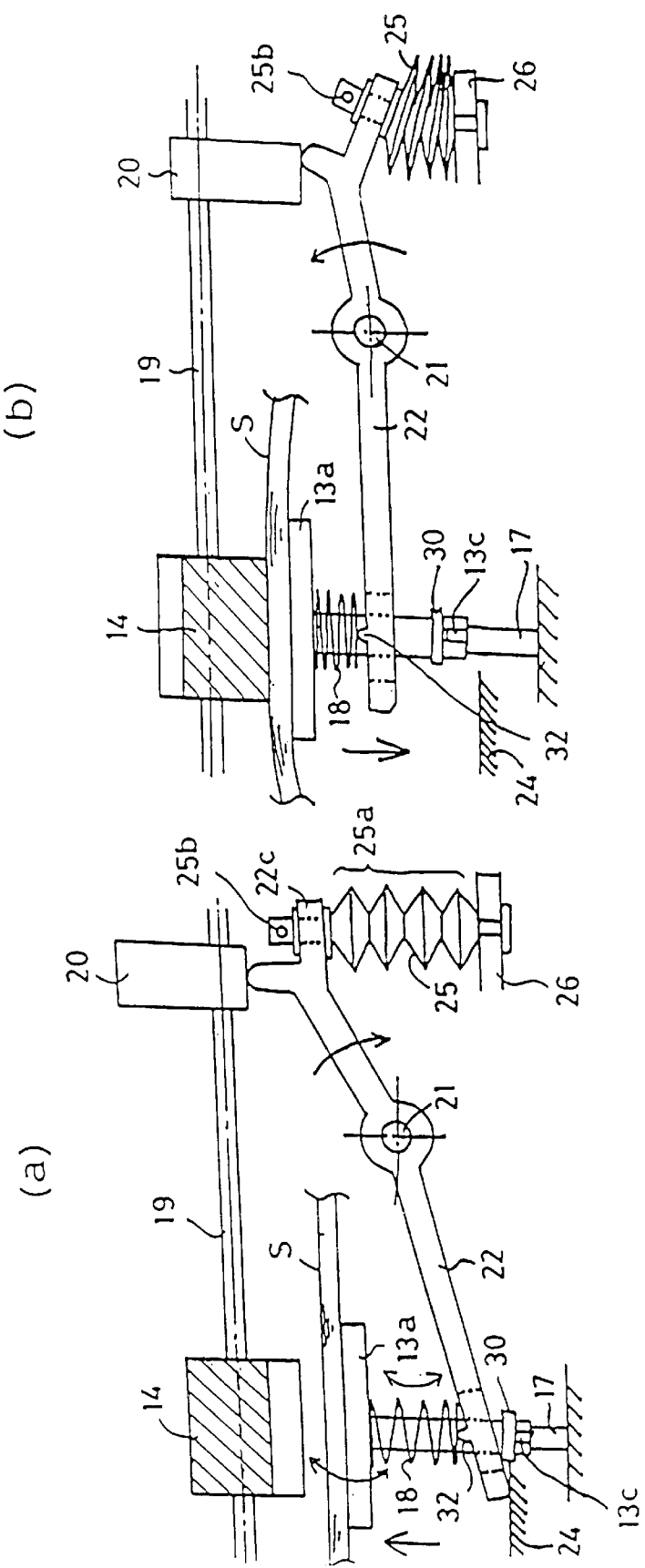
FIG. 10 is an illustration showing an embodiment in which an impact absorbing member in addition to an air damper is formed as a damper means at an impact area between a lever member and a pushing member.
Figure 11:
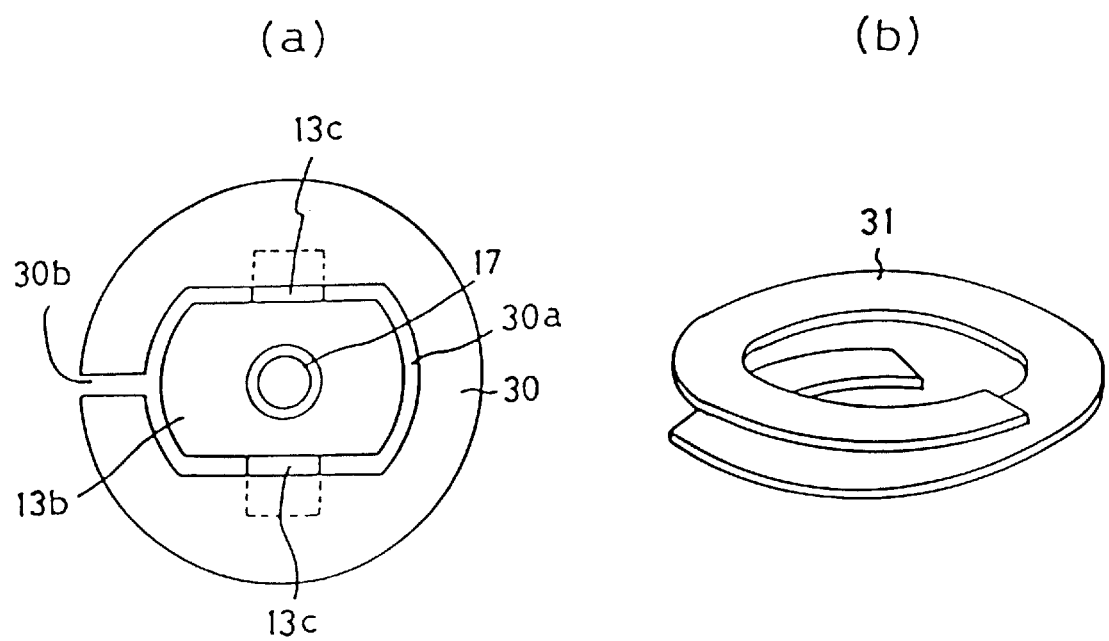
FIGS. 11(a) and (b) are illustrations showing an impact absorbing member.

Referring to FIGS. 10, 11, another example of the damper means is described. FIG. 10 is an illustration showing an embodiment in which an impact absorbing member in addition to an air damper is formed as a damper means at an impact area between a lever member and a pushing member; FIG. 11 is an illustration showing an impact absorbing member. The sheet feeding apparatus and the image processing apparatus using this air damper are essentially the same as the above embodiment, and the same reference numbers are used for members having the same functions as those of the embodiment described above.

This embodiment also relates to reduction of impact sounds when sheets are fed as well as the above embodiments. In the above embodiment, an example in which the air damper 25 reduces impacts generated when the lever member 22 strikes the fixing portion 24 is described. This embodiment further reduces impact sounds when an end of the lever member 22 strikes the stopper 13c of the feeding plate 13 while the lever member 22 returns to the home position shown in FIG. 10(a) from a feeding position shown in FIG. 10(b).

One of differences from the above embodiment is a point that a damper ring 30 is provided as an impact absorbing member between a lower surface of an end of the lever member 222 and a stopper 13c. The damper ring 30 has an elasticity absorbing impacts occurring when the lever member 22 hits, has a hole 30a as seen in the top cross-sectional view of FIG. 11(a), and is mounted as to enclose the stem 13b of the feeding plate 13. This damper ring 30 overlaps the stopper 13c and has a slit 30b allowing the ring to be mountable from a side of the stem 13b. It is desirable to form the stem 13b and the hole 30a commonly in an I-cut or D-cut shape to prevent the damper ring 30 from rotating with respect to the stem 13b during operation. As a material for making the damper ring 30, an elastomer or the like that can easily convert impacts to thermal energy is desirably used.

The damper ring 30 thus provided between the end lower surface of the lever member 22 and the stopper 13c absorbs impacts when the lever member 22 strikes the stopper 13c and can further effectively reduce impact sounds in synergism with reduction effects on the impact sounds of the air damper 25 as described above.

Instead of the damper ring 30 thus described, an elastic spring member 31 in a spiral shape as shown in, e.g., FIG. 11(b) can make the impact absorbing member. Even such a spring member 31 can absorb impacts when the lever member 22 strikes and reduce impact sounds. Where the impact absorbing member is constituted of the spring member 31 as shown in FIG. 11(b), the number of turns should be set to three or less since such a spring member can be easily assembled.

Figure 12:
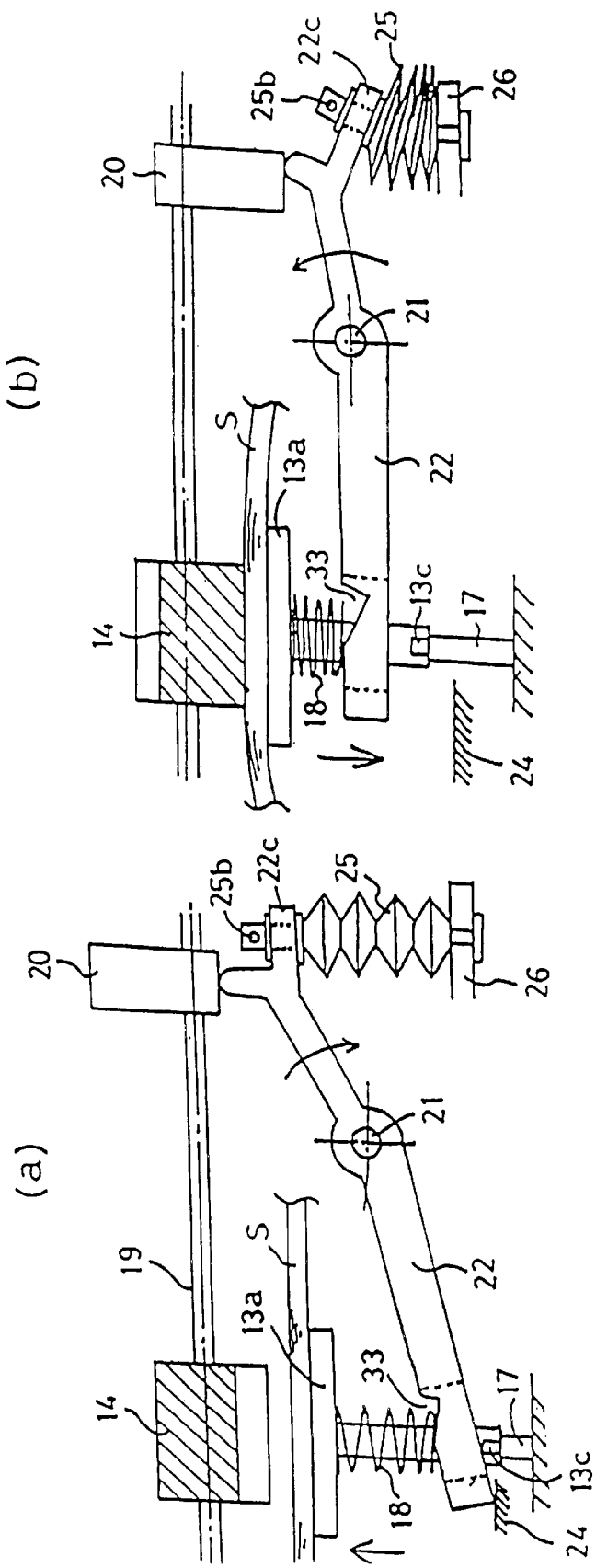
FIGS. 12(a) and (b) are illustrations showing another embodiment in which a bottom surface of a feeding spring is supported at two points.

Referring to FIGS. 2, 3, and 12, an embodiment capable of pushing up the feeding plate 13 by the lever member 22 without exerting unnecessary force is described.

As shown in FIG. 2, the second end of the lever member 22 forms a spring seat for the feeding spring 18, and in fact, two protection portions 32 are provided at an area where the lever member 22 strikes the feeding spring 18. The feeding spring 18 is therefore supported by the two projection portions 32 of the lever member 22. The projection portions 32 are located in positions symmetric with each other with respect to the spring center in the diameter of the feeding spring 18, and a line connecting the two projecting portions 32 extends parallel with respect to the pivotal shaft of the lever member 22.

Accordingly, as shown in FIG. 3, where the lever member 22 moves in a swinging manner in shifting from a state shown in FIG. 3(a), then, a state shown in FIG. 3(b), and to a state shown in FIG. 3(a), an angle change may appear on a basic surface of the spring seat for the feeding spring on the lever member 22. However, the bottom of the feeding spring 18 is supported by the two points of the projection portions 32, and therefore, the bottom of the feeding spring 18 is always positioned parallel to a horizontal surface.

If no projection portion exists, and if the bottom of the feeding spring 18 is held by the entire surface that is subject to such an angle change, the bottom surface of the feeding spring 18 would be also subject to an angle change. In this state, a moment occurs on the feeding spring 18 as shown in a direction of arrow x in FIG. 3(a). The stem 13b of the feeding plate 13 may be arranged with a play with respect to the shaft 17, the moment operates in a direction to rotate the feeding plate 13 in a direction of arrow y via the top face of the feeding spring 18, thereby resultantly giving unnecessary force to the sheets S.

To the contrary, with this embodiment, in which the bottom surface of the feeding spring 18 is supported at two points at least during pivotal movements of the lever member 22, no above moment occurs since the bottom surface of the feeding spring 18 always maintains parallel to a horizontal face, thereby stably feeding the sheets S without exerting unnecessary force to the sheets S.

It is to be noted that the contact portion to support the feeding spring 18 can be constituted of not only the projection portions 32 but also those shown in FIG. 12. FIG. 12 is an illustration showing another embodiment in which a bottom surface of a feeding spring is supported at two points. Cut away portions are formed by cutting off two portions of the spring contacting portions of the lever member 22, and the corners of the cut away portions support the feeding spring 18. This structure also brings substantially the same effects.

Figure 13:
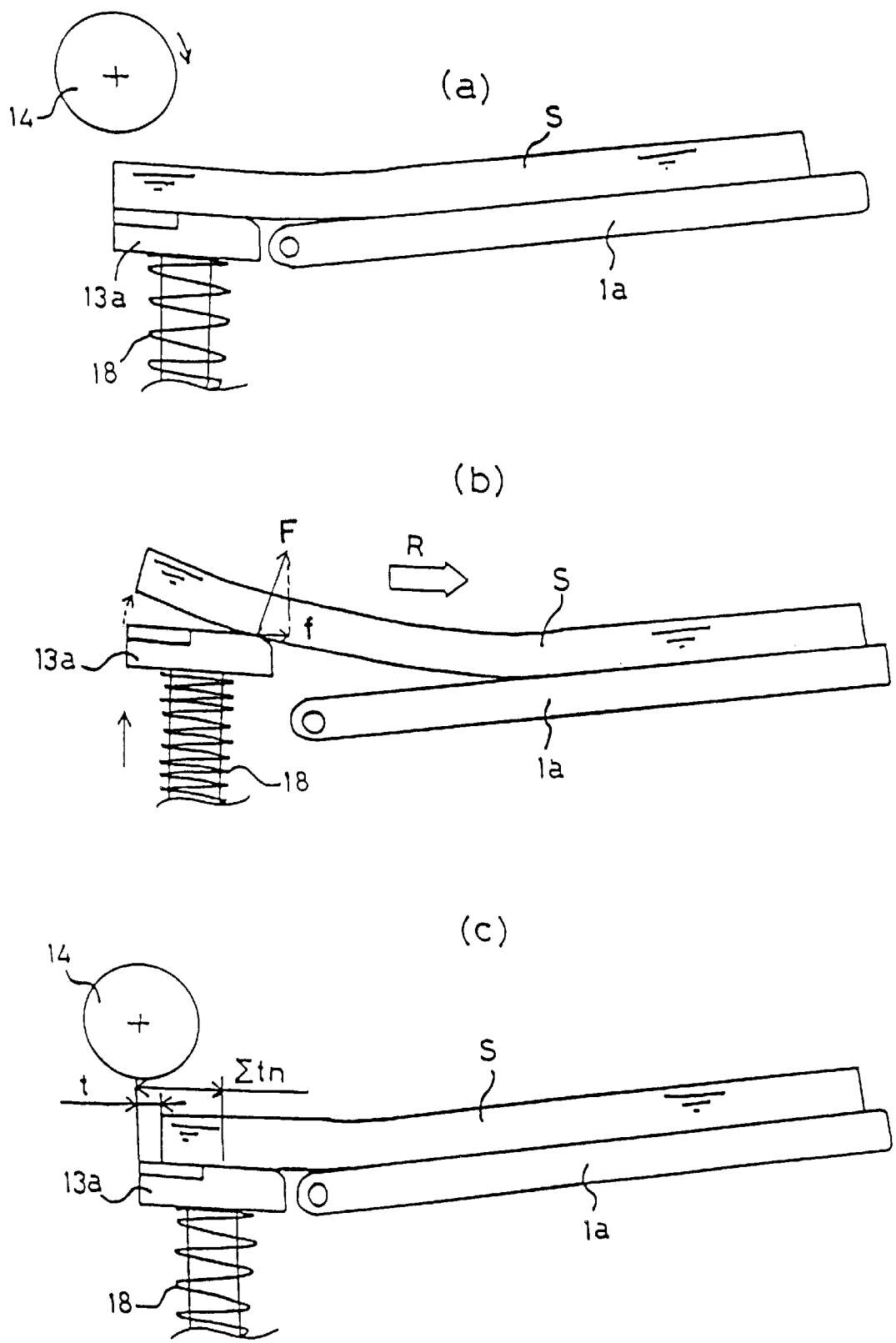
FIGS. 13(a), (b) and (c) are illustrations showing a state that a mounted sheet bundle goes back at a sheet conveyance time.
Figure 14:
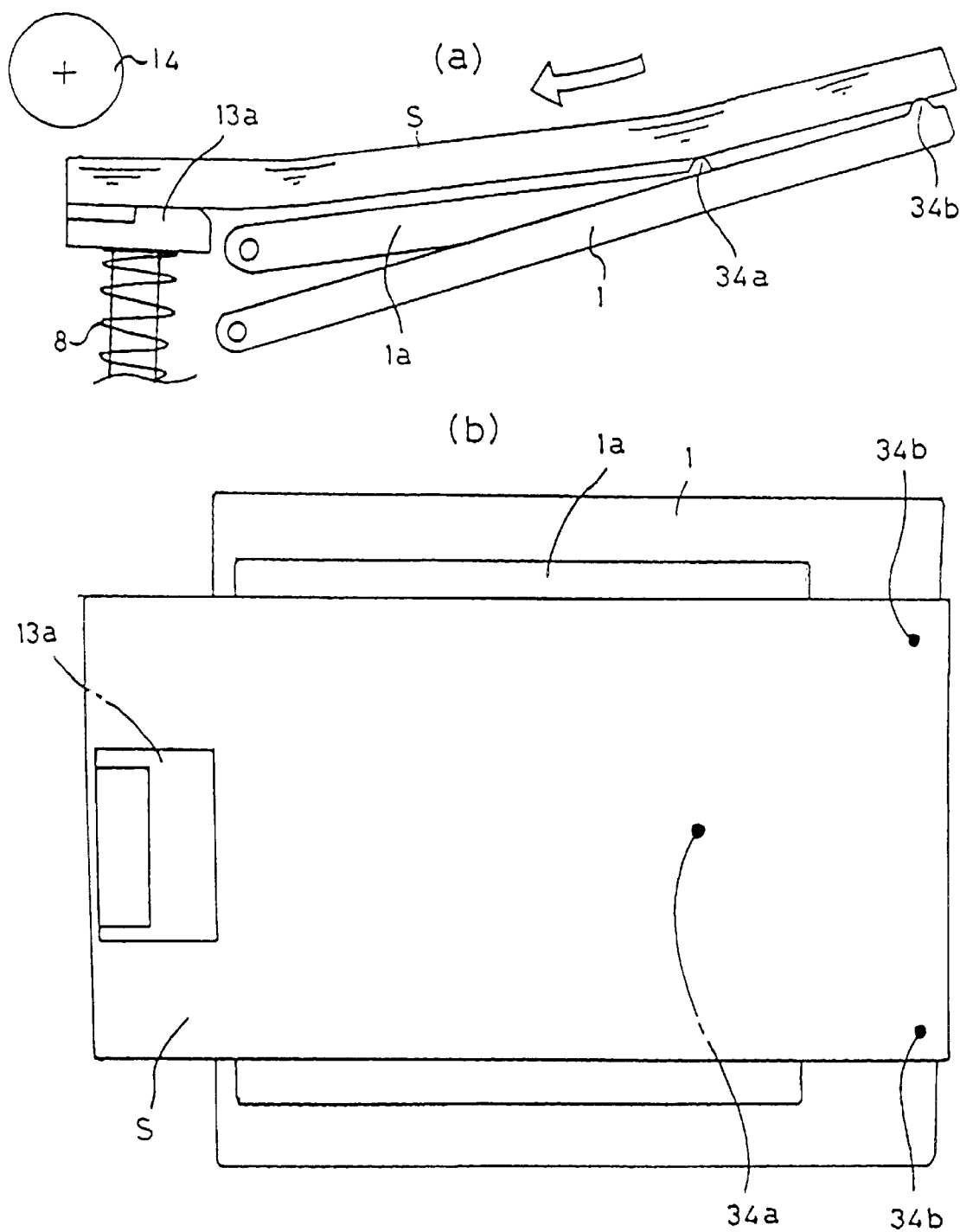
FIGS. 14(a) and (b) are illustrations showing an embodiment in which a projection is formed on a sheet mounting surface.
Figure 15:
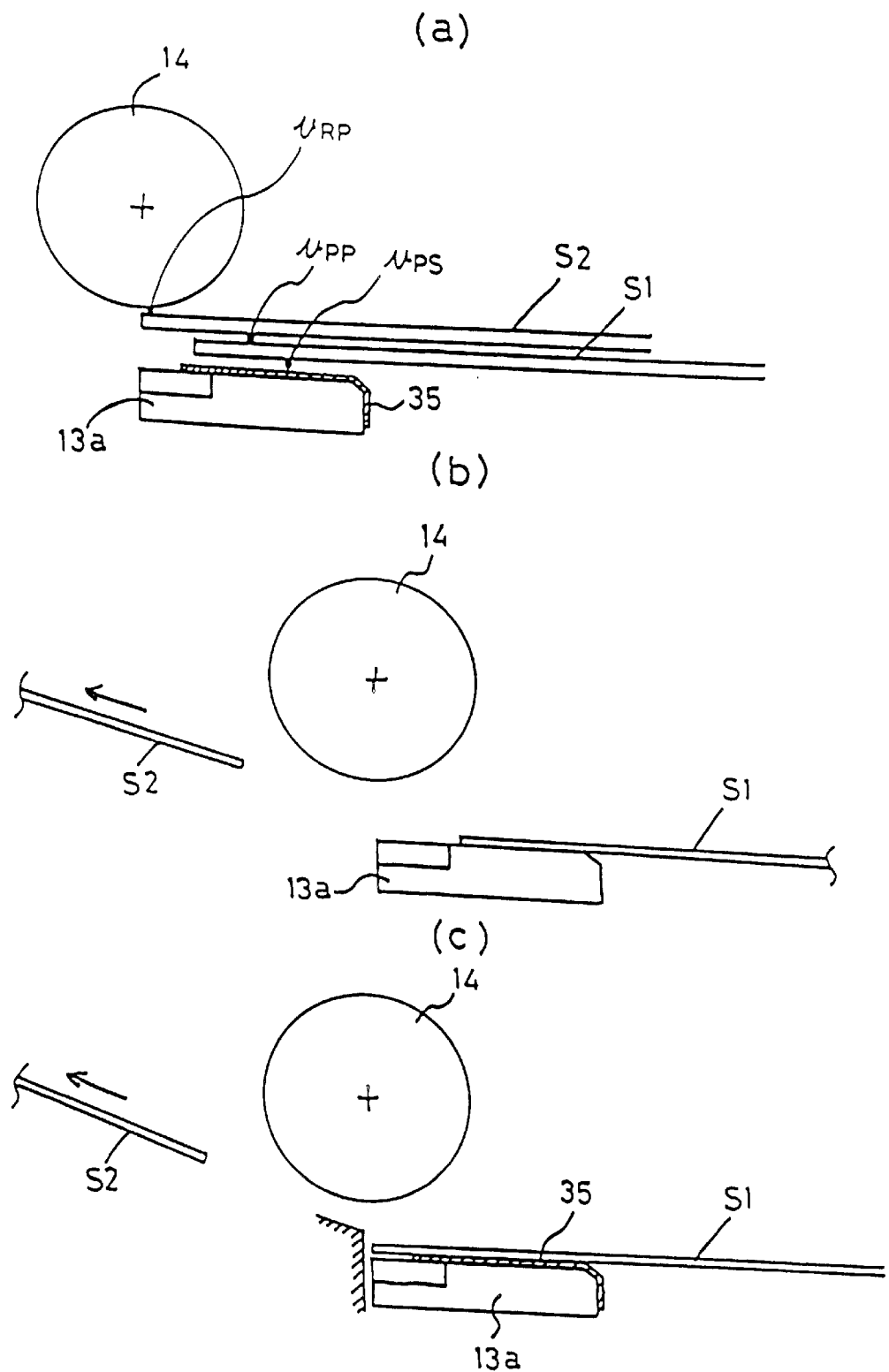
FIGS. 15(a), (b) and (c) are illustrations showing an embodiment in which a low friction sheet is attached to a sheet mounting surface.

Referring to FIGS. 13 to 15, an embodiment in which backward movements of the sheets S during sheet feeding do not cause feeding defects is described. FIG. 13 is an illustration showing a state that a mounted sheet bundle goes back at a sheet conveyance time; FIG. 14 is an illustration showing an embodiment in which a projection is formed on a sheet mounting surface; FIG. 15 is an illustration showing an embodiment in which a low friction sheet is attached to a sheet mounting surface.

As shown in FIG. 13(a), with a structure in which sheets S are fed by a feeding plate 13 having a narrow length, a sheet located at the bottom of the sheet bundle contacts with some area of the mounting tray 1a on the mounting tray 1a. When the feeding plate 13 lefts the front end of the sheet bundle with force F during feeding as shown in FIG. 13(b) in shifting from the home position as shown in FIG. 13(a), force f corresponding to the force makes the sheet bundle back in a direction of arrow R though done slightly. Subsequently, when the feeding plate 13 returns to the home position after finishing the feeding operation as shown in FIG. 13(c), the rear portion of the sheet bundles is held by resistance between the bottom sheet S and the mounting surface, and therefore, the sheets S move in a state where the sheet bundle is made back in comparison with the state shown in FIG. 13(a) (move amount t1).

If this feeding operation is repeated, the sheet bundle may be backed to a position where the front end of the sheet does not reach the pickup roller 14 during feeding (move amount $\Sigma$tn, n is the number of feeding operations), and some feeding defect may occur.

To solve this problem, projection portions 34a, 34b are formed on the mounting tray 1a and the front cover 1 as shown in FIG. 14 to reduce the contact area between the sheet bundle and the mounting surface. FIG. 14(b) is a top view of the sheet mounting portion. With this embodiment, three of the projection portions 34a, 34b are arranged to support the sheet bundle at the three points, thereby reducing the contact resistance between the sheet bundle and the mounting tray 1a.

This structure allows the feeding plate 13 to be made smaller and can prevent the sheet bundle from moving back and feeding defects from occurring.

To reduce the contact resistance as mush as possible, the friction resistance of the sheet mounting portions is desirably set to 1.0 or less. The projection portions 34a, 34b can be made of a low friction member (e.g., POM or the like) as a separate body with respect to the mounting tray 1a and the front cover 1. This eliminates necessity that the mounting tray 1a and the front cover 1 are to be made entirely of a low friction material, and therefore, it would be advantageous for part precision and costs. The same effects can be obtained as a matter of course, where the sheet mounting surface is made of a low friction material even without providing the projection portions 34a, 34b supporting the sheets on the sheet mounting surface or where some low friction sheets are attached onto the sheet mounting surface, to reduce the contact resistance to sheets S.

Furthermore, as shown in FIG. 15, a low friction sheet 35 can be attached onto the mounting surface 13a of the feeding plate 13, and thereby the sheets S can be fed more stably. More specifically, when the sheets S is made back by feeding with the pickup roller 14 as illustrated in FIG. 13, a state shown in FIG. 15(a) may appear where sheets S of a small number are mounted. That is, a sheet S2 (hereinafter referred to as "right above sheet") right above the sheet S1 located at the lowest position (hereinafter referred to as "lowest sheet") exists at a position where the pickup roller 14 can feed it, but the lowest sheet S1 is moved back at a position where the pickup roller 14 cannot feed it. Friction coefficient between the surface of the pickup roller 14 and right above sheet S2 is $\mu$RP; friction coefficient between the lowest sheet S1 and the right above sheet S2 is $\mu$PP; friction coefficient between the lowest sheet S1 and the mounting surface 13a of the feeding plate 13 is $\mu$PS. Generally, when the pickup roller 14 feeds the right above sheet S2, $\mu$RP>$\mu$PP is satisfied, but if $\mu$PP >$\mu$PS, the lowest sheet S1 cannot be forwarded to a position where the pickup roller 14 can feed it as shown in FIG. 15(b). As a result, the front end of the lowest sheet S1 does not reach the pickup roller 14, thereby causing feeding defects.

To solve this problem, a low friction sheet 35 is attached on the mounting surface 13a of the feeding plate 13 as shown in FIGS. 15(a), 15(c) as to make $\mu$PP>$\mu$PS. The lowest sheet S1 is forwarded to a prescribed position when the right above sheet is conveyed, thereby preventing feeding defects from occurring.

It is to be noted that the mounting surface 13a of the feeding plate 13 itself can be made of a low frictional material without using the low friction sheet 35 to obtain substantially the same effects.

Figure 16:
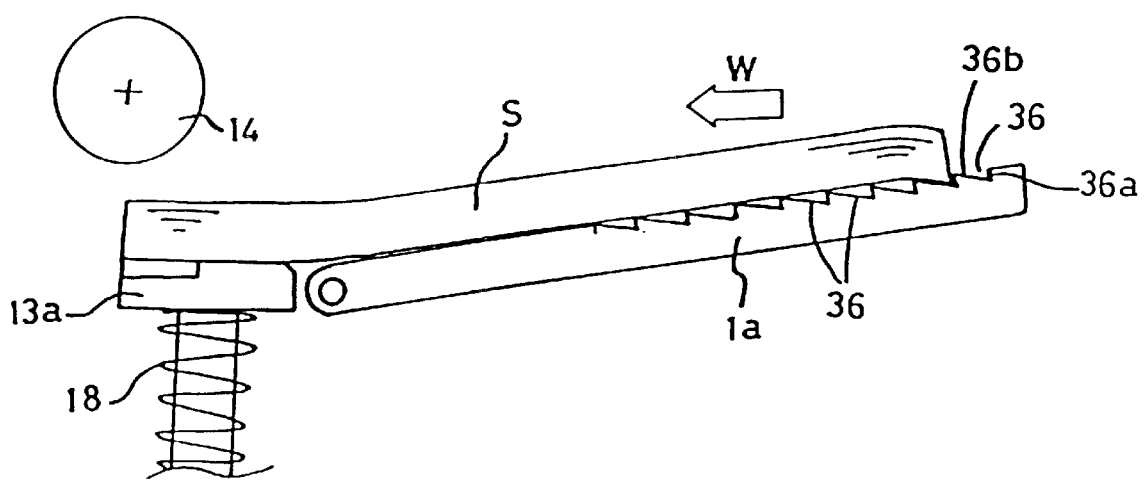
FIG. 16 is an illustration showing an embodiment in which a step portion is provided on a sheet mounting surface for engaging with the rear end of a sheet bundle.
Figure 17:
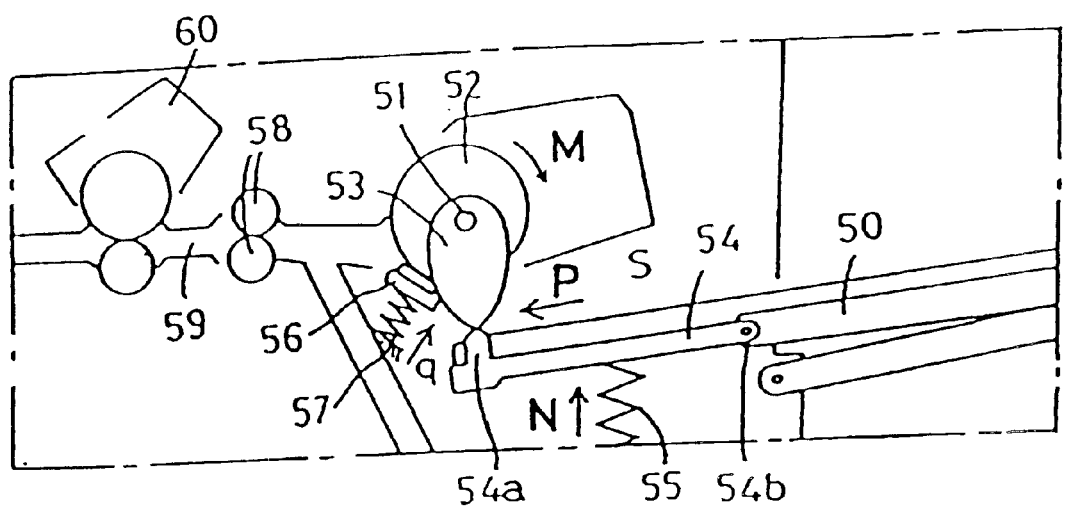
FIG. 17 is an illustration showing a prior art sheet feeding apparatus.

Referring to FIG. 16, an embodiment in which the mounted sheet bundle does not move back during sheet feeding is described. FIG. 16 is an illustration showing an embodiment in which a step portion is provided on a sheet mounting surface for engaging with the rear end of a sheet bundle. The sheet feeding apparatus and the image processing apparatus using this air damper are essentially the same as the above embodiment, and the same reference numbers are used for members having the same functions as those of the embodiment described above.

With this embodiment, to prevent the sheets S illustrated in FIG. 13 from moving backward, a step portion serving as a restriction portion for restricting the rear end of the sheets from moving backward in the sheet feeding direction is arranged on a mounting surface of the mounting tray 1a. The step portion 36 is formed continuously around the rear end of the sheet bundle and has a serrated shape such that the rear end of the sheet bundle may be engaged with it when the sheet bundle is about to move backward. The step portion 36 restricts backward movements even if the sheet bundle tries to move backward due to up and down movements of the feeding plate 13, so that the sheets do not come out of the feeding position, and feeding defects will never occur.

The step portion 36 is formed in a successive manner in the sheet proceeding direction to correspond to various sheet sizes and is desirably made of walls 36a vertical with respect to the mounting tray surface to effectuate sheet engagement ability and taper portions 36b to prevent the sheet front end from engaging when the sheet bundle is set in a direction of arrow W. The pitch of the step portion 36 is desirably set to 3 mm or less in consideration that the rear end of the sheet bundle comes to engage with an engagement portion even where the rear end is disengaged from another engagement portion located right before the engagement portion.

In the embodiments described above, although the sheet feeding apparatus B is exemplified for use for the electrophotographic type laser beam printer, the apparatus is not limited to ones of such an electrophotographic type, and is applicable, as a matter of course, to image forming apparatuses of ink jet recording systems, thermal transfer recording systems, and the like.

Moreover, the image processing means can be not only the image forming means thus described but also an image reading means. That is, the sheet feeding apparatus B can be suitably used for an image reading apparatus in which an original document as a sheet S is set and fed sheet by sheet separately and in which information written on the document is read by an image reading means as an image processing means.

What is claimed is:

1. A sheet feeding apparatus for feeding sheets separately from a sheet bundle, comprising:
   sheet supporting means for supporting sheets;
   feeding rotary means for feeding the sheets;
   pushing means for pushing the sheets supported by sheet supporting means onto the feeding rotary means, wherein said pushing means moves between a pushing position and a non-pushing position in association with rotation of the feeding rotary means; and
   damper means connecting to the pushing means for reducing impacts occurring as a result of movement of said pushing means in association with rotation of the feeding rotary means.

2. The sheet feeding apparatus according to claim 1, wherein the damper means has an air damper placed between the pushing means and a fixing portion of the apparatus, wherein said air damper reduces the impacts by flowing air into and from said air damper in association with movement of the pushing means.

3. The sheet feeding apparatus according to claim 2, wherein said pushing means has a pushing member pivotable mounted between said pushing position and non-pushing position and a feeding spring for biasing said pushing member toward the feeding rotary means and said air damper disposed between said pushing member and the fixing portion of the apparatus.

4. The sheet feeding apparatus according to claim 3, wherein the air damper has a larger air resistance when the pushing means moves in a direction that the sheet is pushed toward the feeding rotary means and a smaller air resistance when the pushing means moves in a direction that the sheet is not pushed toward the feeding rotary means.

5. The sheet feeding apparatus according to claim 1, wherein the pushing means includes a lever member, which is pivotable in association with rotation of the feeding rotary means, and a pushing member, which pushes the sheet to the feeding rotary means through a feeding spring according to pivotal movement of the lever member, and wherein the damper means has an impact absorbing member at an impact area between the lever member and the pushing member.

6. The sheet feeding apparatus according to claim 1, wherein the sheet supporting means and a sheet pushing member of the pushing means have a friction coefficient of 1.0 or less with respect to mounted sheets.

7. The sheet feeding apparatus according to claim 6, wherein the sheet mounting portion or the sheet pushing member of the pushing means has a projection on a sheet mounting face of the supporting means or a low friction sheet attached on the sheet mounting face.

8. The sheet feeding apparatus according to claim 1, further comprising, at the sheet mounting portion, a restriction portion for restricting a rear end of the mounted sheets from moving backward in a sheet conveyance direction.

9. The sheet feeding apparatus according to claim 1, wherein the pushing means includes a lever member, which is pivotable in association with rotation of the feeding rotary means, and a pushing member which pushes the sheet to the feeding rotary means through a feeding spring according to pivotal movement of the lever member, and said damper means is placed between said lever member and a fixing portion of the apparatus.

10. The sheet feeding apparatus according to claim 9, wherein said damper means has an air damper and the air damper has a smaller air resistance when the pushing means moves in a direction that the sheet is pushed toward the feeding rotary means and a larger air resistance when the pushing means moves in a direction that the sheet is not pushed toward the feeding rotary means.

11. The sheet feeding apparatus according to claim 10, wherein the lever member is held at a midway portion thereof, and the pushing means has a cam disposed as to be capable of contacting to one end of the lever member in association with rotation of the feeding rotary means, and wherein the other end of the lever member makes the pushing member operate to push the sheets onto the feeding rotary means through the feeding spring when the one end of the lever member is contacted with the cam.

12. The sheet feeding apparatus according to claim 10, wherein the pushing member has a separation pad for preventing the sheets placed on a downstream side in a sheet conveyance direction from being doubly fed, and wherein the separation pad pushes the sheet onto the feeding rotary body through a separation spring in association with rotation of the lever member.

13. The sheet feeding apparatus according to claim 10, wherein the feeding spring and the pushing means contact to each other at least at two points during pivotal movement of the lever member.

14. The sheet feeding apparatus according to claim 10, wherein said air damper reduces the impact which is occurring when said lever member strikes the fixing portion of the apparatus with the large air resistance.

15. An image forming apparatus comprising:
   sheet supporting means for supporting sheets;
   feeding rotary means for feeding the sheets;
   pushing means for pushing the sheets supported by sheet supporting means onto the feeding rotary means, wherein said pushing means moves between a pushing position and a non-pushing position in association with rotation of the feeding rotary means;
   damper means connecting to the pushing means for reducing impacts occurring as a result of movement of said pushing means in association with rotation of the feeding rotary means; and
   image processing means for reading images set forth on sheet fed by the feeding rotary means or forming images on sheets fed by the feeding rotary means.

* * * * *

UNITED STATES PATENT AND TRADEMARK OFFICE
CERTIFICATE OF CORRECTION

PATENT NO.     : 6,337,751 B1
DATED          : January 8, 2002
INVENTOR(S)    : Eiichiro Kimizuka It is certified that error appears in the above-identified patent and that said Letters Patent is hereby corrected as shown below:

Column 4,
Line 26, "bone" should read -- borne --.

Column 5,
Line 10, "Similarly" should read -- Similarly, --.

Column 8,
Line 15, "differences" should read -- the differences --.
Line 19, "impacts" should read -- impact --.
Line 40, "reduce" should read -- reduces --.

Column 9,
Line 40, "lefts" should read -- leaves --.

Column 11,
Line 48, "able" should read -- ably --.

Signed and Sealed this

Twenty-first Day of May, 2002

Attest:

Attesting Officer

JAMES E. ROGAN
*Director of the United States Patent and Trademark Office*